United States Patent [19]

White et al.

[11] Patent Number: 5,538,114
[45] Date of Patent: Jul. 23, 1996

[54] INSULATING WHEEL MOUNTING SYSTEM FOR REDUCED HEAT TRANSFER

[75] Inventors: Jay D. White, Galesburg; Ralph W. Larson, Olivet, both of Mich.

[73] Assignee: Eaton Corporation, Cleveland, Ohio

[21] Appl. No.: 358,428

[22] Filed: Dec. 19, 1994

[51] Int. Cl.⁶ ............................................. F16D 65/78
[52] U.S. Cl. .................. 188/218 R; 188/264 G; 301/6.91
[58] Field of Search ............... 188/218 R, 264 G, 188/264 W, 264 A, 251 M, 264 AA, 218 A, 71.6; 301/6.91, 65, 64.7, 64.4; 192/112

[56] References Cited

U.S. PATENT DOCUMENTS

| | | | |
|---|---|---|---|
| 1,767,522 | 6/1930 | Evans | 301/6.91 X |
| 2,059,170 | 10/1936 | Farr. | |
| 2,366,262 | 1/1945 | Hollerith | 188/218 R |
| 2,998,870 | 9/1961 | Herman et al. | |
| 3,003,598 | 10/1961 | Sumner et al. | 188/218 R |
| 3,035,667 | 5/1962 | Malthaner | 188/218 R |
| 3,332,774 | 7/1967 | Tuttle | 188/218 R X |
| 4,130,187 | 12/1978 | Midolo | 188/264 |
| 4,262,789 | 4/1981 | Collins | 192/113 |
| 5,234,259 | 8/1993 | Nishimuro et al. | 301/64.4 |
| 5,277,479 | 1/1994 | Koyama et al. | 301/64.7 |
| 5,320,201 | 6/1994 | White. | |

FOREIGN PATENT DOCUMENTS

| | | | |
|---|---|---|---|
| 2-38101 | 2/1909 | Japan | 301/6.91 |
| 714997 | 9/1954 | United Kingdom. | |

Primary Examiner—Douglas C. Butler
Attorney, Agent, or Firm—Loren H. Uthoff, Jr.; Howard D. Gordon

[57] ABSTRACT

A brake drum and wheel assembly having a reduced heat transfer coefficient having an insulating ring formed in a flange section of the wheel disposed to be clamped against a drum extension attached to a cylindrical main drum. In an alternate embodiment, the drum extension is coated with a thermal insulating material such that a layer of the insulating material is disposed between the wheel flange section and the drum extension.

2 Claims, 2 Drawing Sheets

5,538,114

INSULATING WHEEL MOUNTING SYSTEM FOR REDUCED HEAT TRANSFER

BACKGROUND OF THE INVENTION

1. Field of the Invention

The present invention relates to a system to mount a wheel to a brake drum. More specifically, the present invention relates to a system to mount a wheel to a brake drum with reduced heat transfer for extending tire life.

2. Description of the Prior Art

In an effort to reduce the unsprung weight of the tire/wheel/brake system on heavy duty over-the-road trucks to increase payload and improve performance, the wheel material has been changed from steel to aluminum while the brake drum has been redesigned for lighter weight using a centrifuge process to deposit a cast iron coating on a steel drum rather than a full cast iron drum. Both of these changes have dramatically reduced the overall weight of the wheel/brake combination thereby allowing for the carrying of additional cargo. However, the negative effect is that significantly more heat is conducted from the brake drum into the wheel and finally into the tire, specifically at the tire bead, which causes the tire service life to be reduced due to the elevated temperatures experienced during high duty cycle braking.

Various fins and air scoops have been fitted to the brake drum to improve heat dissipation into the surrounding air with some success. Also, airflow channels have been formed in the outer peripheral surface of the drum to promote airflow between the drum and the wheel to lower the tire operating temperature. U.S. Pat. Nos. 5,320,201; 2,059,170; 2,998,870 and British Patent No. 714,997, the disclosures of which are hereby expressly incorporated by reference describe such systems.

In spite of these efforts, the switch to centrifuge drums (where a cast iron braking surface is applied to a spinning steel drum) and aluminum wheels have resulted in a need for additional heat management to prevent overtemperature of the tire, especially at the tire bead.

SUMMARY OF THE INVENTION

The present invention modifies the interface between a vehicle brake drum assembly and wheel from a thermodynamic standpoint to lower the operating temperature of a tire mounted on the wheel, especially at the tire bead. An insulating material is formed as a section of the wheel which is positioned to be disposed between a drum extension and the aluminum structure of the wheel. In this manner, the coefficient of thermal conduction is reduced to minimize heat transfer from the brake drum assembly to the wheel.

In an alternate embodiment, the drum extension which is used to connect the wheel to the main drum is coated with a material that functions as a heat insulator thereby providing for decreased heat transfer between the main drum and the wheel. Also, a weldable material having a low thermal conductivity, such as stainless steel, could be used for the drum extension.

DETAILED DESCRIPTION OF THE PREFERRED EMBODIMENT

Figure 1:
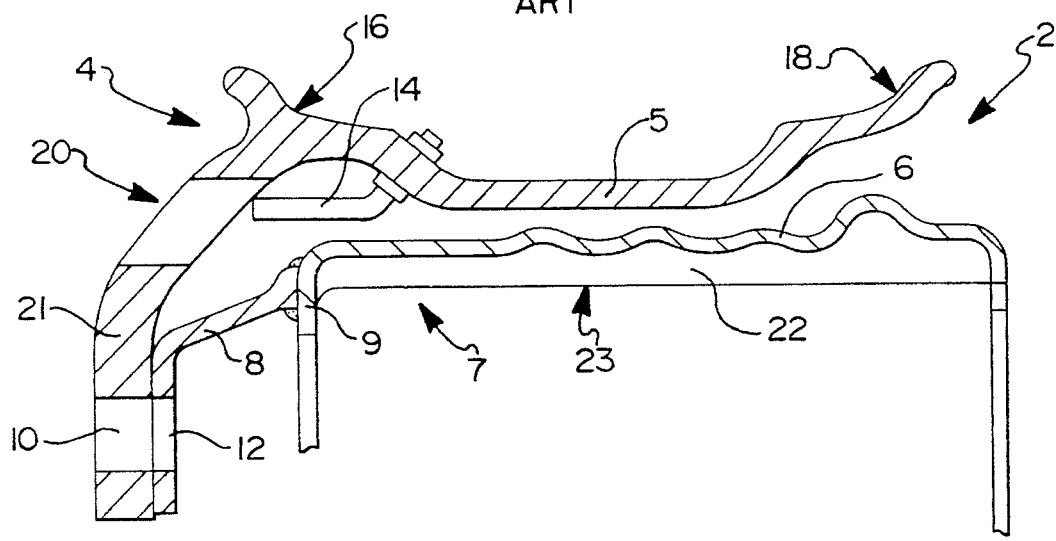
FIG. 1 is a partial cross-sectional view of a prior art centrifuge drum and aluminum wheel assembly.

In this disclosure, certain terminology will be used for convenience and reference only and will not be limiting. For example, the terms "rightward" and "leftward" will refer to directions in the drawings connection with which the terminology is used. The terms "inwardly" and "outwardly" will refer to directions toward and away from, respectively, the geometric center of the apparatus being described. The terms "upward" and "downward" refer to directions as taken in the drawings connection with which the terminology is used. All foregoing terms include normal derivatives and equivalents thereof.

Now referring to FIG. 1 of the drawings, a partial cross-sectional view of a prior art wheel and brake drum assembly 2 is shown. An aluminum wheel 4 is normally attached to an axle or axle spindle with a brake drum assembly 7 sandwiched therebetween consisting of a main drum 6 and a drum extension 8 using a plurality of bolts (not shown) passing through bolt holes 10 and 12. The wheel 4 includes a rim 5 supporting a valve stem assembly 14 used to inflate a tire (not shown) mounted to the wheel 4 and sealing against the wheel 4 at the bead seats 16 and 18. The valve stem assembly 14 is accessed through one of a plurality of hand hold openings 20 which can also function to permit airflow into and out of the outer surface of the brake drum 6 along with facilitating handling. A flange section 21 is formed with the rim 5 and is bolted to the axle (not shown) using a plurality of bolts which pass through bolt holes 10 and 12.

In the construction of a centrifuge brake drum assembly 2, a steel main drum 6 is spun on its axis while a molten cast iron is introduced and allowed to coat the inner surface of the main drum 6 to form a cast iron liner 22. The cast iron liner 22 is then machined to form a smooth, uniform braking surface 23 against which a brake pad frictionally contacts to provide the braking function. The drum extension 8 is welded to the outside face of the brake drum 6 at the attachment flange 9 thereby completing a lightweight, durable brake drum assembly 7 to which a wheel 4 can be attached.

To provide a lightweight wheel and brake drum assembly 2, a wheel 4 constructed of an aluminum alloy can be used to further reduce weight. However, the increased thermal conductivity of the aluminum material as opposed to steel, results in higher temperatures at the bead seats 16 and 18 due to conduction of the heat generated at the braking surface 23 through the main drum 6 into the drum extension 8 and into the wheel 4. High temperature at the bead seats 16 and/or 18 reduce the service life of the tire mounted thereon due to chemical changes which result in a breakdown of the materials used to fabricate the tire.

Figure 2:
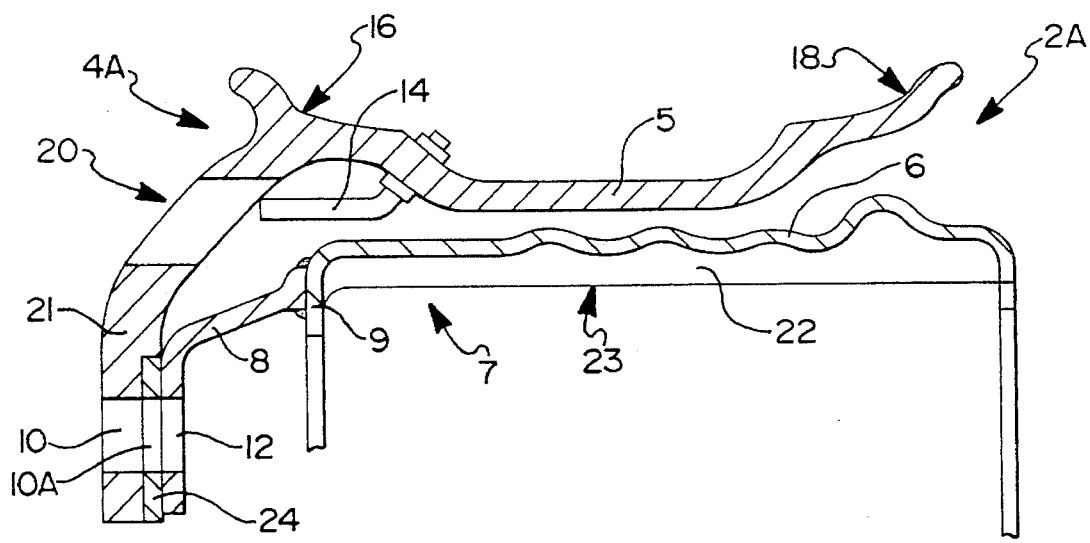
FIG. 2 is a partial cross-sectional view of the brake drum and wheel assembly of the present invention.

Now referring to FIG. 2, a partial cross-sectional view of the wheel and brake drum assembly 2A of the present invention comprised of a wheel 4A mounted to a brake drum assembly 7 is shown. The use of the wheel and brake drum assembly 4A results in lower operating temperatures at the bead seats 16 and 18 thereby improving the service life of a tire mounted thereon. The brake drum assembly 7 consists of a drum extension 8 attached to an attachment flange 9 of the main drum 6 having an inner surface coated with a cast iron liner 22 to form a braking surface 23 as described previously. An insulating ring 24 is formed on and attached to the flange section 21 of the wheel 4A. The insulating ring 24 can be made of a variety of select materials having a relatively low value of thermal conductivity such as certain ceramics, a metal matrix composite material such as aluminum silicon carbide, alumina or a high alloy steel with a low thermal conductivity such as stainless steel, or combinations thereof, thereby providing an interface between the wheel flange section 21 and the drum extension 8 that functions as a barrier to heat transfer. The ceramic material can be sprayed on the wheel flange section 21 using a variety of commonly known application techniques that provide an acceptable bonding strength and a smooth surface finish. In the alternative, stainless steel can be used for the insulating ring 24 which can be cast into the wheel 4A during manufacture. A like number of bolt holes 10A to coincide with the bolt holes 10 are formed in the insulating ring 24 to provide for retention of the wheel 4A to the brake drum assembly 7.

Figure 3:
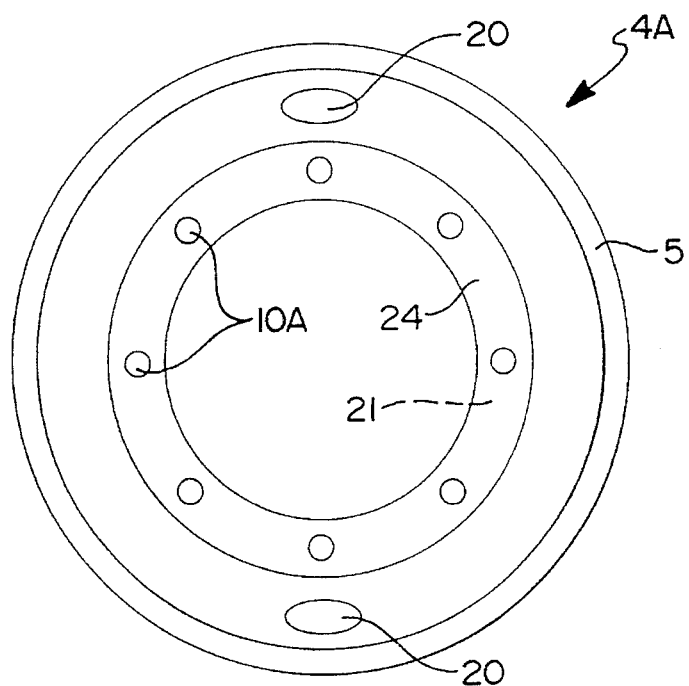
FIG. 3 is a plan view of the wheel of the present invention.

FIG. 3 shows the inside of the wheel 4A of FIG. 2 with the annular insulating ring 24 clearly shown. Also, more clearly shown is the insulating ring 24 having a plurality of bolt holes 10A formed therein to coincide with the bolt holes 10 formed in the wheel flange section 21. Two hand hold openings 20 are shown, although any number could be used to promote airflow between the wheel 4A and the main drum 6.

Figure 4:
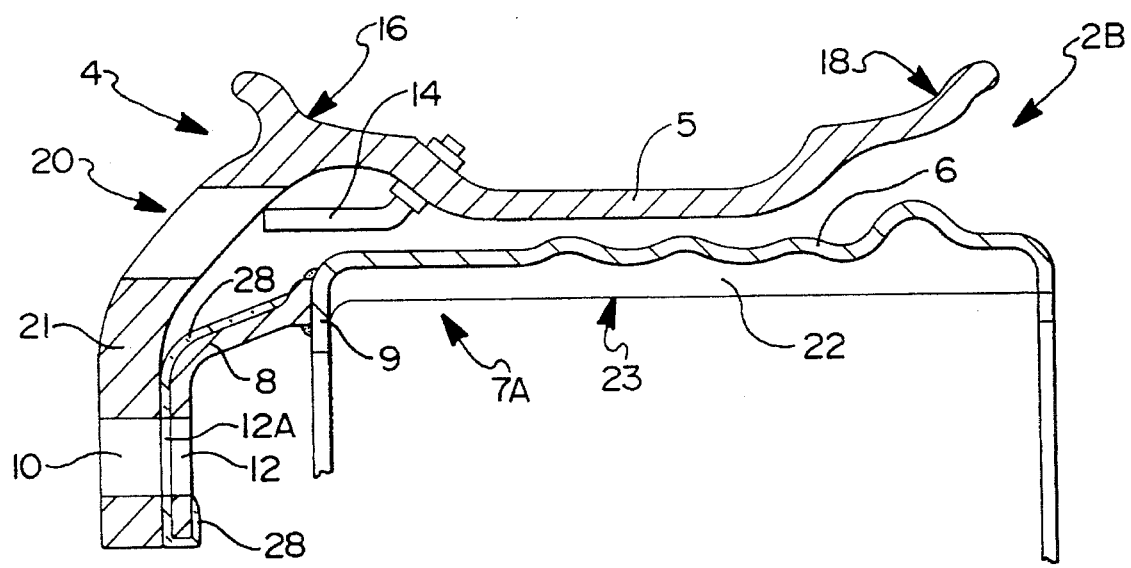
FIG. 4 is a partial cross-sectional view of an alternate embodiment of the brake drum and wheel assembly of the present invention.

Now referring to FIG. 4, a partial cross-sectional view of an alternate embodiment of the wheel and brake drum assembly 2B of the present invention comprised of a wheel 4 mounted to a brake drum assembly 7A is shown. The drum assembly 7A consists of a drum extension 8 coated with an insulating material 28 which is attached to the main drum 6 having a cast iron liner 22 on the inner surface machined to form a braking surface 23. The wheel 4 is attached to the drum extension 8 using a plurality of fasteners (not shown but commonly bolts) which pass through the bolt holes 10, 12A and 12. Bolt holes 12A coincide with the bolt holes 10 and 12 thereby providing an aperture therethrough. The insulating material 28 can be a ceramic material which is sprayed or otherwise applied to the drum extension 8, especially the area that is disposed between the wheel flange section 21 and the drum extension 8.

Also, to further limit heat transfer between the main drum 6 and the wheel 4, the drum extension 8 can be made of a weldable material having a relatively low heat transfer coefficient such as stainless steel. The drum extension 8 can then be used either uncoated or coated with the insulating material 28. In this manner, the present invention impedes thermal transfer between the brake drum assembly 7A and the wheel 4 thereby lowering the operational temperature of the bead sections 16 and 18 to improve tire service life.

The description above refers to particular embodiments of the present invention and it is understood that many modifications may be made without departing from the spirit thereof. The embodiments of the invention disclosed and described in the above specification and drawings are presented merely as examples of the invention. Other embodiments, materials, forms and modifications thereof are contemplated as falling within the scope of the present invention only limited by the claims as follows.

We claim:

1. In combination, a vehicle wheel and brake drum comprising:

an annular rim having a pair of bead seats for supporting a tire;

a flange section attached to said annular rim for attachment to a vehicle brake drum;

an insulating ring formed in said flange section, said insulating ring located in said flange section to be positioned between said flange section and said vehicle brake drum for contacting said brake drum;

a main drum having a generally cylindrical braking section and having an open end at a first edge of said braking section and a mounting flange at an opposite second edge of said braking section;

a drum extension attached to said main drum at said mounting flange and having a plurality of mounting holes formed therein, said drum extension being coated with a thermally insulating material.

2. A wheel and brake drum assembly comprising:

a cylindrical wheel rim having a pair of bead seats for supporting a tire;

a brake drum having a generally cylindrical main drum section comprising a steel outer surface and a cast iron inner surface, said brake drum having a first edge and having a drum mounting flange attached to an opposite second edge;

an annular wheel flange section attached to said wheel rim for mounting said wheel rim to said brake drum;

a drum extension attached to said drum mounting flange, said drum extension supporting said wheel flange section, said drum extension being made of a high alloy steel having a relatively low value of thermal conductivity and coated with a thermally insulating material in an area where said wheel flange section contacts said drum extension;

an insulating ring formed in said wheel flange section, said insulating ring positioned to contact said wheel flange and said thermally insulating material to provide a thermal barrier to the transfer of heat from said brake drum to said wheel flange section.

* * * * *